United States Patent [19]
Franceschini et al.
[11] 3,885,131
[45] May 20, 1975

[54] AIR-BEARING DATA TRANSFER SYSTEM

[75] Inventors: John B. Franceschini, Centerport; Leonard Meltzer, Little Neck, both of N.Y.

[73] Assignee: Dynell Electronics Corporation, Melville, N.Y.

[22] Filed: Apr. 13, 1973

[21] Appl. No.: 351,084

[52] U.S. Cl. .......... 235/61.11 E; 360/103; 250/239; 250/570; 250/578
[51] Int. Cl. .......... G06k 7/10
[58] Field of Search ....... 235/61.11 E; 340/174.1 E; 360/99, 102, 103; 250/239, 570, 578

[56] References Cited

UNITED STATES PATENTS

| | | | |
|---|---|---|---|
| 3,303,485 | 2/1967 | Lee | 340/174.1 E |
| 3,368,210 | 2/1968 | Zimmer | 340/174.1 E |
| 3,774,183 | 11/1973 | Roscamp | 340/174.1 E |

*Primary Examiner*—Stanley M. Urynowicz, Jr.
*Attorney, Agent, or Firm*—Eisenman, Allsopp & Strack

[57] ABSTRACT

There is disclosed an air-bearing data transfer system in which the data transfer head operates in extremely close proximity to the data-storing surface, the head being brought to the surface by an adjustable but relatively unyielding mount only after high relative motion is established and with force normal to the surface sufficient to cause the surface to deform in an amount in excess of its normal run-out, the head being pivotally mounted in its roll-and-pitch axis to accommodate the geometry of the continuously deformed surface.

8 Claims, 4 Drawing Figures

AIR-BEARING DATA TRANSFER SYSTEM

BACKGROUND OF THE INVENTION

It is well known that extremely large amounts of data can be stored on rotating discs or drums using, for example, optical or magnetic storage. The data-storage density is limited ultimately by the resolution and precision of the data writing and reading mechanisms rather than the medium itself. The resolution is limited using magnetic storage techniques by the proximity of the writing and reading heads to the medium and using optical storage techniques by the depth of focus and resolution of the writing and reading optical system. Maintaining the medium within the depth of focus of both the illuminating and reading optical system generally controls the achievable optical resolution.

Accordingly, it is one object of the invention to provide a new and improved data-transfer system by means of which data can be retrieved from a rapidly moving storage medium having a plurality of closely spaced data tracks.

Another object of the invention is to provide an improved optical data-transfer system in which a relatively large area of the data-storage medium can be maintained within the depth of focus of both the illuminating optical system and in extremely close proximity to an optical reading system (within the depth of focus of the optical reading system) without at any time establishing destructive physical contact.

SUMMARY OF THE INVENTION

In accordance with the present invention, a data-transfer system is provided in which data stored, for example, in the form of optical samples located in closely spaced tracks, i.e., alternate opaque and transparent portions in a track, on a whirling disc formed, for example, of flat glass, is read out by a multi-channel data-transfer head in the form of a flat air bearing movably mounted adjacent the glass surface and adapted to be brought into close proximity thereto after spinning motion is established. The movable mount for the data-transfer head is relatively unyielding in directions away from the spinning surface by referencing it, for example, to an immovable frame part, with sufficient pressure being established so that the air bearing actually deforms the spinning glass by bending it out of its normal plane. The amount of travel of the head toward the spinning surface is adjustable and is selected at an amount which deforms or bends the glass by an amount exceeding the run-out or wobble which is inherent in any rotary plate system. Thus, the run-out factor is completely over-ridden and an absolutely constant spacing is established between the data-transfer head and the data-carrying surface. By forming the intelligence on the opposed surface of the spinning disc, which is preferably illuminated from the reverse side, high resolution is achieved by providing a narrow transverse light slot across the face of the data-transfer head. The body of the data-transfer head includes, aligned behind the slot, a sequence of photoelectric diodes corresponding in spacing and number to the number of circular tracks on the storage medium.

While a relatively rigid unyielding coupling is established between the frame and the data-transfer head in a direction normal to the plane, a resilient pivotal mount is provided through a single coupling pin which enables the head to pivot in pitch-and-roll modes while constraining it against turning in the yaw mode. Thus, the head with its transverse slot is able to track continuing deformation of the spinning data plate without loss of resolution or change in head spacing from the proximate plane of the disc.

DESCRIPTION OF THE PREFERRED EMBODIMENT

Figure 1:
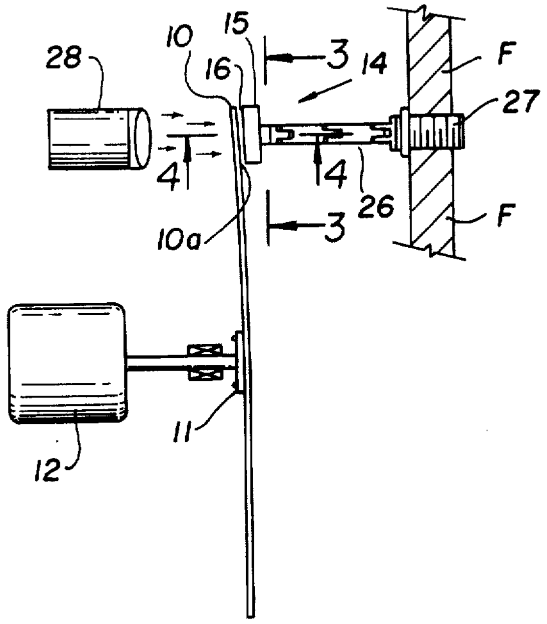
FIG. 1 is a top view partially diagrammatic in nature of an air-bearing data-transfer system utilizing optical data storage and retrieval.
Figure 2:
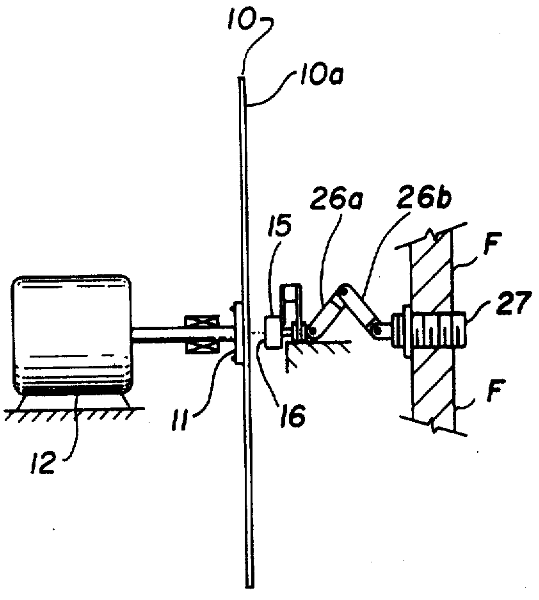
FIG. 2 is a view in side elevation of the system of FIG. 1.
Figure 3:
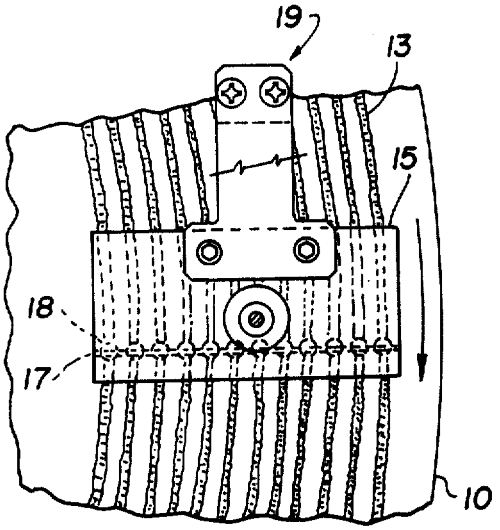
FIG. 3 is an enlarged fragmentary view in transverse section taken on the line 3—3 of FIG. 1 looking in the direction of the arrows.
Figure 4:
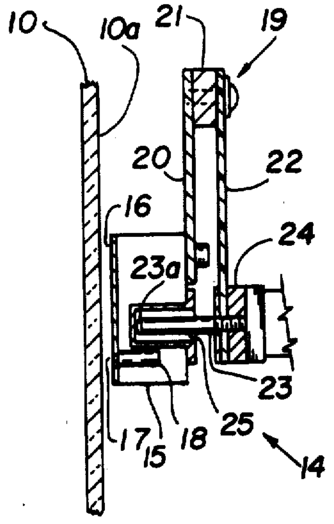
FIG. 4 is an enlarged fragmentary view in transverse section taken on the line 4—4 of FIG. 1 looking in the direction of the arrows.

Referring first to FIGS. 1 and 2, the invention is embodied in an optical data-transfer system including a flat circular disc 10 formed, for example, of glass, connected to a hub 11 and adapted to be driven in high-speed rotary motion by a motor 12. The front surface **10*a* of the disc 10 includes a plurality of closely spaced concentric tracks 13 which, as best seen in FIG. 3, include alternate light-opaque and light-transparent areas, with all other portions of the disc being rendered opaque. This intelligence, which can take a wide variety of forms and one example of which is embodied in the copending application Ser. No. 392,079 filed Aug. 30, 1973, is presented on the precise outer surface of the disc 10** by means, for example, of metallic depositions onto the glass substrate. While a plurality of channels can be provided in one data-transfer system, twelve have been illustrated in the drawings for simplicity of demonstration.

Movably mounted adjacent the data-carrying surface **10*a* is a data-transfer head assembly, indicated generally by the numeral 14. The working head 15 of the data-transfer assembly comprises a body including on its outer face an air-bearing surface 16 which is made flat to a high degree of accuracy and which is opaque throughout with the exception of a narrow transverse slot 17, behind which is an array of twelve photodiodes 18 corresponding in number and lateral position to the data tracks 13 of the disc 10. The photodiodes are adapted to be connected to a suitable read-out system not forming part of the present invention, but an example of which is disclosed in the said copending application Ser. No. 392,079. The head 15 includes a mounting bracket assembly 19 consisting of a rigid arm 20 bolted to the head 15 and attached at its remote end through a coupling block 21 to a resilient arm 22, which can take the form of a flat spring, the free end of which carries a pivot pin 23 secured in a mounting block 24. The pivot pin 23 includes a rounded tip 23*a* which seats in a recess 25 formed in the body of the head 15. The point of engagement of the rounded pivot tip 23*a* with the flat seat of the recess 25 is located slightly rearwardly of the center of the long sides in the direction of relative motion between the head and the disc 10**.

The head 15 with its resilient mounting bracket and pivot assembly 19 is carried by a movable linkage 26 including a pair of toggle links 26*a* and 26*b*, rigidly but adjustably coupled to a frame part F through a threaded coupling 27. In the quiescent state of the system, the toggle link is broken to draw the head 15 away from the surface 10*a* of the disc 10. Only when the disc 10 is rotating at its full operating speed is the toggle linkage actuated to press the head 15, by means of positive pressure referenced to the frame F, against the surface of the disc. As the air-bearing surface 16 of the head moves close to the surface 10*a* of the disc, an air wedge is developed due to the thrust through the pin 23 toward the rotating disc at a point nearer the trailing edge than the leading edge. As the toggle is pressed home, additional force is developed which is sufficient to deform the disc 10 by bending it rearwardly. The air wedge, however, continues to function and an absolutely constant spacing is established between the air-bearing surface 16 and the data-bearing surface 10*a*. The amount of deformation or bending deflection of the disc 10 is established at a value which substantially exceeds the normal run-out or wobble of the spinning disc 10 and, in this fashion, run-out error, that is, change in spacing of the surfaces 10*a* and 16 with each rotation of the disc, is precluded. The disc continues to rotate at high speed under variable deformation force imposed by the data-transfer head 15 but without physical contact. With dimensional consistency thus established, read-out of the data can be undertaken using, for example, a light source 28 on the opposite side of the disc 10 from the data-transfer head, with the light passing through the transparent portions of the optical tracks 13 and through the closely adjacent light slot 17 which crosses the tracks perpendicularly. The combination of the slot and its close proximity to the data tracks provides the ultimate in reading resolution.

In a representative embodiment of the invention, the intelligence or data tracks were recorded on a flat glass disc of approximately 10 inches in radius with the innermost track having a radius of approximately 7 inches and the outermost track a radius of 9 inches. The disc was rotated at a speed of 480 revolutions per minute, establishing a relative speed between the air-bearing surface and the disc of approximately 2,000 feet per minute. The surface area of the air-bearing surface was approximately 2 square inches with the head measuring 1 inch in the direction of relative motion. The thrust pin 23 was located 0.4 inch from the trailing edge. A force of approximately 3 pounds was applied along the axis of the thrust pin 23, causing the glass disc 10 to deform approximately 0.025 inch. The typical run-out or wobble of such a disc in a reasonably well-prepared mounting is approximately 0.005 inch, using a disc with a glass thickness of 0.123 inch. The width of the slot 17 and the widths of the tracks 13 were respectively 2 inches and 0.010 inch. In operation, an average gap or spacing between the surfaces 10*a* and 16 was $70 \times 10^{-6}$ inch.

In operation with the data-transfer air-bearing surface 16 pressed hard against the speeding data surface of the record, the latter will be bent slightly out of its normal plane. This will bring about a small roll movement of the data-transfer body about the tip 23*a* of the thrust pin 23. The oversize diameter of the recess 25 accommodates this movement, as does the torsional resilience of spring arm 22 which is part of a supplementary support system for the data-transfer head 15. Also, any slight movement of the record deriving from run-out error will induce slight pitch-axis movement of the data-transfer body about the tip of the thrust pin. This motion is also accommodated by the oversize recess 25 and by the flexural mode bending of the spring arm 22. Thus, the air-bearing surface precisely tracks the data-carrying surface at all times. The position of the thrust pin slightly rearwardly of centerline between the leading and trailing edges, maintains a slight cocking of the air-bearing plane relative to the plane of the data-carrying surface 10*a*, so that the essential air wedge is maintained at all times to preclude direct contact between the relatively movable elements. Yaw mode motion of the data-transfer head, i.e., turning motion about the axis of the thrust pin, which would adversely affect alignment of the pickup diodes 18 with the respective data tracks 13, is precluded by the supplementary support because the spring arm 22 resists lateral bending in its own plane.

While the invention has been described above having reference to a preferred embodiment thereof, it will be understood that it can take other forms and arrangements. Thus, for example, a drum can be used in lieu of a disc, assuming appropriate resilience of the drum surface can be established. Also, a wide variety of track patterns and forms can be provided and couplings other than optical can be provided such, for example, as magnetic, between the data surface and the data-transfer head. The invention should not, therefore, be regarded as limited except as defined in the following claims:

What is claimed is:

1. In an air-bearing data-transfer system, a rotary member having a data-storage face and having an inherent run-out error in rotation causing recurrent reciprocating movement in a direction perpendicular to said face with each rotation, said member being resiliently deformable in a direction perpendicular to said face, a data-transfer head having an air-bearing surface opposing the storage face and having a geometry compatible therewith to establish an air bearing therebetween, control means to move the record and data-transfer head into close proximity to establish the air bearing between the surfaces when rotary motion obtains and to establish further movement in the perpendicular direction to deform the record opposite the air bearing by an amount exceeding the run-out error, and anchoring means having a resilience less than that of the data-storage face to maintain the data-transfer head continuously in said record-deforming position, whereby a fixed predetermined spacing is established between the data-transfer head and the data-storage face.

2. A data-transfer system as set forth in claim 1, said record comprising a disc rotatable about a perpendicular axis coupled to its center, said data-transfer head having a substantially flat air-bearing surface opposing the surface of the disc and disposed eccentrically with respect thereto to deform the disc by bending it beyond the run-out error.

3. A data-transfer system as set forth in claim 1, said data-transfer head being movable toward and away from said record, said control means being coupled to the data-transfer head and including adjustable means to selectively position the air-bearing surface over a range of distances approaching and beyond the unstressed run-out of the data-storage face.

4. A data-transfer system as set forth in claim 3, said control means including a single-point contact thrust pin engaging the data-transfer head closer to its trailing edge than its leading edge in the direction of relative movement with respect to the record.

5. A data-transfer system as set forth in claim 4, including a supplemental resilient support for the data-transfer head affording pivotal movement about the thrust pin to accomodate pitch-and-roll movement, and means to preclude yaw movement about an axis perpendicular to the data-storage face.

6. A data-transfer system as set forth in claim 4, said data-transfer head having a recess formed in the back surface thereof to receive said thrust pin and to establish engagement therewith at a point close to the air-bearing surface thereof.

7. A data-transfer head assembly comprising a body portion, an air bearing on one surface thereof, a thrust pin pivotally engaging the body in a direct coupling to impart thrust perpendicular to the air bearing, a supplementary resilient support for the body affording pivotal movement about the tip of the thrust pin about the roll-and-pitch axis of the air bearing comprising a spring member coupled to the pivot pin and affording torsional resilience and bending resilience in one plane, said spring member extending in a direction radially away from the pin, and a relatively rigid member coupling the end of the spring remote from the pivot to the data transfer body, said supplementary resilient support also including restraining means to preclude yaw movement about the axis of the pin, a plurality of radiation responsive members mounted in a transverse row on said body, a radiation mask covering the members, and means forming a radiation-permeable slot in the mask along the transverse row.

8. In a method for establishing an air-film barrier of substantially uniform thickness between a data-transfer head and a relatively movable data-storing record of resilient structure and having a surface contour conforming to that of the data-transfer head to define an air bearing therebetween when the faces are in close proximity, the steps of establishing relative movement between the data-transfer head and the record in the plane of the air bearing with the two elements relatively widely spaced apart, determining the amount of change of spacing due to run-out error between the air bearing and the record in a direction perpendicular to the opposed surfaces while they are parted, pressing the head and record together to establish an air bearing therebetween and further pressing the two together to deform the record by an amount in excess of the change of spacing due to run-out error, and securing the head against movement perpendicularly away from the record.

* * * * *